PREPARATION OF AMINOTHIOLS AND AMINO-
SELENOLS BY IMPROVED ALKALI FUSION
AND THEIR DERIVATIVES
Lester Horwitz, Bronx, and Charles A. Clark, Binghamton, N.Y., assignors to General Aniline & Film Corporation, New York, N.Y., a corporation of Delaware
No Drawing. Filed May 1, 1959, Ser. No. 810,210
7 Claims. (Cl. 260—573)

This invention relates to the preparation of ortho-aminobenzenethiols and ortho-aminobenzeneselenols. More particularly, it relates to the preparation of intermediates useful in the synthesis of sensitizing dyes.

The preparation of many benzothiazoles and benzoselenazoles, which are used as intermediates in the synthesis of sensitizing dyes, employs as the most important starting materials, anilines which are substituted in ortho-position to the amino group by a thiol or selenol group. These substituted anilines are unstable, decompose rapidly, and are difficult to prepare. One procedure involves the reduction to the ortho-substituted amines of the appropriate nitro, nitroso or azo compounds, but suffers from the shortcoming that these compounds, which serve as starting materials, are usually very difficult to prepare. The reductions do not proceed smoothly; at best, the yields are extremely poor.

It has further been proposed to prepare the substituted anilines by the dilute aqueous alkali cleavage of azoles, such as benzothiazoles or benzoselenazoles in which the 5-membered nitrogenous heterocyclic nucleus fused to an aromatic neucleus contains, in addition to one nitrogen atom, an additional hetero atom, e.g., a sulfur or selenium atom. This alkali treatment has been carried out in aqueous solutions or in autoclaves at superatmospheric pressures. In either case, the heating period is prolonged and on the order of six hours or more. During this time, decomposition and aerial oxidation take place and the yields are very poor.

It is an object of this invention to provide an improved process for the preparation of ortho-aminobenzenethiols and ortho-aminobenzeneselenols which gives improved yields and requires less time.

It is another object of this invention to convert these ortho-substituted anilines into azoles which differ by their substitution in the 2-position from the azoles used as starting materials.

Other objects will be apparent from the following description.

We have found that azoles, particularly benzothiazoles, benzoselenazoles, naphthothiazoles and naphthoselenazoles which carry in the 2-position a substituent other than a hydrogen atom or a hydrocarbon group can be converted into anilines which are substituted in the position ortho to the aromatic amino group by a thiol or selenol group by fusing such azoles in a fusion mixture containing a mixture of potassium hydroxide, sodium hydroxide and a sulfur-containing reducing agent such as elemental sulfur, an alkali metal sulfide, e.g., sodium sulfide, potassium sulfide or mixtures of alkali polysulfides, as they are present in certain commercially available grades of sodium sulfide, at a temperature ranging from 200° C. to 280° C. for a period of time ranging from 3 to 30 minutes. The choice of temperature and of heating period depends somewhat on batch size and choice of starting material. The use of the mixture of potassium hydroxide and sodium hydroxide permits a lower fusion temperature than that obtainable with either of the alkali hydroxides alone. The presence of the reducing agent serves to maintain a reducing atmosphere or reduction potential which prevents oxidative destruction of the amines formed during fusion.

The azoles which serve as starting materials are characterized by the following general formula:

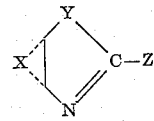

wherein X represents the atoms necessary to complete an aromatic ring system, preferably of the benzene and naphthalene series, wherein said aromatic ring may be further substituted, for instance, by an alkyl group, e.g., methyl, ethyl, n-propyl, isopropyl, n-butyl, isobutyl, and the like, and aryl group, e.g., phenyl, tolyl and the like, a carboxy group, a carboxyalkyl group, e.g., carboxymethyl and the like; Y represents a selenium or sulfur atom so as to complete a benzoselenazole, naphthoselenazole, benzothiazole, or naphthothiazole nucleus; and Z represents a substituent other than a hydrogen atom and hydrocarbon radical, and includes halide atoms, e.g., chlorine or bromine atoms, a hydroxy group, an amino group, alkyl-substituted amino group, aryl-substituted amino group, a thiol, a thioalkyl or a thioaryl group. Disulfides can be used in place of the thiol derivatives.

As representative of such azoles, the following are mentioned:

5-methyl-2-mercaptobenzothiazole
6-methyl-2-mercaptobenzothiazole
7-methyl-2-mercaptobenzothiazole
6-tert.-butyl-2-mercaptobenzothiazole
6-phenyl-2-mercaptobenzothiazole
5-hydroxy-2-mercaptobenzothiazole
5-chloro-2-mercaptobenzothiazole
5-bromo-2-mercaptobenzothiazole
6-chloro-2-mercaptobenzothiazole
6-bromo-2-mercaptobenzothiazole
6-nitro-2-mercaptobenzothiazole
5-amino-2-mercaptobenzothiazole
6-amino-2-mercaptobenzothiazole
6-acetamido-2-mercaptobenzothiazole
6-benzamido-2-mercaptobenzothiazole
6-dimethylamino-2-mercaptobenzothiazole
5-carboxyl-2-mercaptobenzothiazole
4,6-dimethyl-2-mercaptobenzothiazole
4-methyl-6-chloro-2-mercaptobenzothiazole
6-methyl-5-chloro-2-mercaptobenzothiazole
2,6-dichloro-2-mercaptobenzothiazole
4-carboxy-6-chloro-2-mercaptobenzothiazole
4,6-dimethyl-7-chloro-2-mercaptobenzothiazole
4,6-dimethyl-5,7-dichloro-2-mercaptobenzothiazole
4,5-benzo-2-mercaptobenzothiazole
6,7-benzo-2-mercaptobenzothiazole
2-hydroxybenzothiazole
6-methyl-2-hydroxybenzothiazole
4-chloro-2-hydroxybenzothiazole
5-chloro-2-hydoxybenzothiazole
6-bromo-2-hydroxybenzothiazole
6-nitro-2-hydroxybenzothiazole
6-methyl-5-bromo-2-hydroxybenzothiazole
4,5-benzo-2-hydroxybenzothiazole
6-methyl-2-chlorobenzothiazole
6-chloro-2-chlorobenzothiazole
6-bromo-2-chlorobenzothiazole
6-nitro-2-chlorobenzothiazole
4,5-benzo-2-chlorobenzothiazole
6,7-benzo-2-chlorobenzothiazole
4-methyl-2-aminobenzothiazole
5-methyl-2-aminobenzothiazole
6-methyl-2-aminobenzothiazole 6-phenyl-2-aminobenzothiazole
6-chloro-2-aminobenzothiazole
6-bromo-2-aminobenzothiazole
4-nitro-2-aminobenzothiazole
6-nitro-2-aminobenzothiazole
4,6-dimethyl-2-aminobenzothiazole
5,6-dimethyl-2-aminobenzothiazole
4-methyl-6-chloro-2-aminobenzothiazole
4-methyl-6-bromo-2-aminobenzothiazole
6-methyl-4-bromo-2-aminobenzothiazole
4-methyl-6-nitro-2-aminobenzothiazole
6-methyl-5-nitro-2-aminobenzothiazole
4-bromo-6-chloro-2-aminobenzothiazole
4,6-dibromo-2-aminobenzothiazole
4,5-benzo-2-aminobenzothiazole
6,7-benzo-2-aminobenzothiazole
4,5-benzo-6-chloro-2-aminobenzothiazole
4,5-benzo-6-bromo-2-aminobenzothiazole
5,6-benzo-4-bromo-2-aminobenzothiazole
4,7-dimethyl-6-chloro-2-aminobenzothiazole
4-methyl-5,6-dichloro-2-aminobenzothiazole
6-carbethoxy-2-aminobenzothiazole
2-amino,4,5,6,7-dibenzobenzothiazole
2-mercapto-4,5,6,7-dibenzobenzothiazole
2-amino-5,6-naphthobenzothiazole
2-mercapto-5,6-naphthobenzothiazole
2-amino-6,7-benzobenzothiazole
2-mercapto-6,7-benzobenzothiazole
2-amino-5,6-benzobenzothiazole
2-mercapto-5,6-benzobenzothiazole
2-amino-4,5-fluorenyl(1,2)-thiazole
2-mercapto-4,5-fluorenyl(1,2)-thiazole
6,7-benzo-2-mercaptobenzoselenazole
2-mercaptobenzoselenazole
2-hydroxybenzoselenazole
2-chlorobenzoselenazole
2-bromobenzoselenazole
2-aminobenzoselenazole
6-methyl-2-aminobenzoselenazole
6,7-benzo-2-aminobenzoselenazole
5,6-dimethyl-2-aminobenzoselenazole The reaction is carried out by adding the azole to the fusion mixture containing the two alkali hydroxides and the reducing agent, preferably an alkali sulfide. The amounts of sodium hydroxide and potassium hydroxide used in the fusion mixture are chosen in such a way that a fusion temperature between 200° C. and 280° C. can readily be maintained. The relative amounts required for a selected minimum temperature can be ascertained from the data given on page 606 of Landolt Bernstein's "Physikalisch-Chemische Tabellen," 5th edition (Springer, 1923, Berlin). Mixtures ranging from 20 to 60 mole percents of potassium hydroxide have been found satisfactory while mixtures of equal weight of sodium hydroxide and potassium hydroxide have been preferred for reasons of convenience since these amounts correspond essentially to those of the eutectic mixture.

The amount of reducing agent varies somewhat depending on the type of compound chosen. If an alkali sulfide is employed, the amount of sodium sulfide or potassium sulfide ranges from 2 percent to 20 percent of anhydrous sodium sulfide based on the total weight of the alkali fusion mixture. The amount of azole added to the fusion mixture amounts to from 20 to 80 percent by weight based on the combined weight of potassium hydroxide and sodium hydroxide. In all instances, the ratio is adjusted so as to get a liquid melt at the end of the fusion time. The azole is preferably added to the melted fusion mixture; if desired, the azole can be mixed with the alkali hydroxide-alkali sulfide mixture in the cold, in which case the mixture is brought rapidly to the desired fusion temperature and maintained there for from 5 to 15 minutes.

After the fusion, the mixture is diluted with water resulting in a solution or suspension of the desired ortho-substituted aniline. From this, many products can be formed which are particularly useful as intermediates in the preparation of sensitizing dyes. The following shows the type of products which can be obtained by reaction with acetic anhydride, carbon disulfide or phosgene:

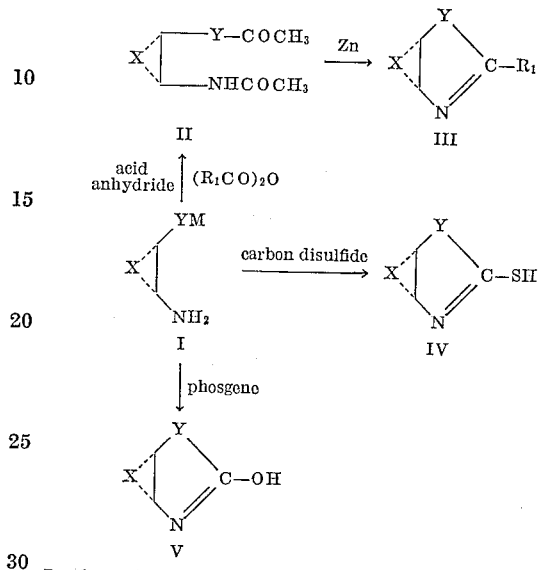

In these formulae X and Y have the values given above, M is hydrogen or the alkali metal used in the fusion, and $R_1$ represents the hydrocarbon residue of the acid anhydride.

The 2-substituted benzothiazoles and benzoselenazoles thus obtained are valuable photographic products. For instance, the 2-methyl-azoles illustrated by compound III have extreme importance as intermediates for the preparation of sensitizing dyes. The mercapto azoles illustrated by compound IV are not only sensitizing dye intermediates but serve also as stabilizers in emulsions.

Other reagents with which the ortho-substituted anilines can be reacted to give useful compounds or intermediates useful in the fields of chemotherapy, fungicides and bactericides, mineral dressings, and general chemical intermediates include the following:

Aldehydes
Carboxylic acids and their derivatives
Thiophosgene
Ketones
Alkyl halides
Ethylene oxides
Compounds containing activated double bonds
Nitrous acid
Potassium cyanate
Phenylisothiocyanate
Hydrogencyanide, cyanogen halides, and cyanamide
Picryl chloride
Formic acid (leading to azoles which are unsubstituted in the 2-position)

In many instances the ortho-substituted aniline need not be separated to form the above products. This time-saving step is particularly helpful in such instances where the ortho-substituted aniline is of an irritating nature. In cases in which the separation of the ortho-substituted aniline may be desired, the isolation of the final product can be accomplished by conventional methods.

Our method offers many advantages over those described in the literature. For example, the reported preparation of 2-amino-4,5-dimethylbenzenethiol diacetate from 2-amino-5,6-dimethylbenzothiazole as described in J. C. S. 2217 (1953) requires heating in an autoclave at high pressures for 6 hours, whereas our method allows the preparation of this compound in 15 minutes under atmospheric conditions. United States Patent 2,454,260 describes the fusion of 2-mercaptobenzothiazoles in autoclaves for prolonged periods of time in order to obtain 2-aminobenzenethiols. With our method, this fusion can be accomplished in several minutes in an open vessel. Other references showing the previous difficulties incurred due to long heating periods or by requiring pressure equipment are: United States Patent 2,094,595 and Ann. 558, 10 (1947).

In contrast with the old methods, our procedure provides a fusion process for the preparation of these intermediates which is faster than any known method, gives better and more consistent yields than any known method, and does not require the working up of unreacted materials obtained by other methods and saving, thereby, expensive recovery steps. Moreover, the new procedure makes it possible to convert commercially available azoles into useful intermediates for the preparation of sensitizing dyes and photographic intermediates without necessitating the synthesis of difficulty accessible intermediates. Furthermore, the process works for all compounds in these classes without requiring pressure autoclaves or closed vessels and allows batches of any size to be run at atmospheric pressures, thus resulting in economical benefits since the batch size is not limited by the size and availability of costly autoclaves.

The following examples will serve to illustrate further the manner of practicing our invention:

*Example I*

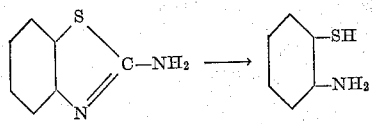

To a melt at a temperature of 240–250° C. of 10 grams potassium hyhroxide, 10 grams of sodium hydroxide, and 1 gram of anhydrous sodium sulfide in an iron crucible were added 10 grams of 2-aminobenzothiazole. After stirring the fusion mixture for 5 minutes at 240° C., there were added 300 milliliters of water and the resulting solution cooled to room temperature. A solution of 2-aminobenzenethiol was obtained. This product could be isolated in pure form by rendering the above solution neutral, extracting it with a suitable solvent such as ether or benzene, evaporating the solvent, and distilling the 2-aminobenzenethiol (B.P./6 mm. 125–127° C.). This isolation of the product is omitted whenever the subsequent reaction permits such omission and use of the alkaline solution because the o-aminobenzenethiol is a powerful skin irritant.

*Example II*

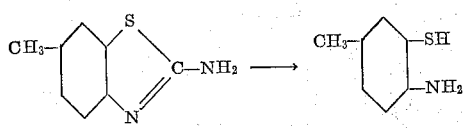

To a melt containing 1200 grams of potassium hydroxide, 1200 grams of sodium hydroxide and 400 grams of sodium sulfide (9 $H_2O$) at 275° C., were added over a period of 15 minutes and with stirring 800 grams of 2-amino-6-methylbenzothiazole. The mixture was heated and stirred manually at 250–275° C. for 5 minutes and then diluted with 7 liters of water. A solution of 2-amino-5-methylbenzenethiol was obtained. The product was isolated in a pure form by neutralization of the solution with hydrochloric acid, followed by extraction with ether or benzene. A highly viscous oil was obtained which oxidized on contact with air. However, this isolation of the product is preferably avoided whenever the subsequent reaction permits the use of the alkaline or acid solution because the pure product is a powerful skin irritant.

*Example III*

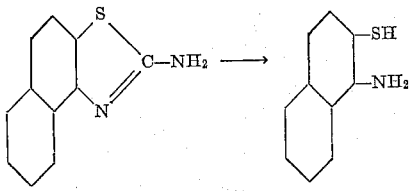

To a melt of 1200 grams of sodium hydroxide, 1200 grams of potassium hydroxide and 500 grams of sodium sulfide (9 $H_2O$) maintained at 250° C. were added 500 grams of 2-amino-4,5-benzobenzothiazole over a period of 15 minutes. The fusion mixture was stirred and kept at the above temperature for an additional 15 minutes. Then the fusion mixture was diluted with water to give a final volume of 8 liters containing 2-amino-3,4-benzobenzenethiol (α-amino-β-thionaphthol) in solution. The product can be isolated by neutralization of the solution with hydrochloric acid and subsequent extraction with ether or benzene. However, this isolation of the product is preferably omitted whenever the subsequent reaction permits the use of a solution because the isolated oil is not only a powerful skin irritant, but oxidizes extremely rapidly on contact with air.

*Example IV*

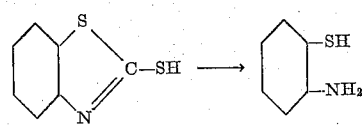

To a melt of 10 grams of potassium hydroxide, 10 grams of sodium hydroxide and 3 grams of sodium sulfide (9 $H_2O$) maintained at 240° C. were added 10 grams of 2-mercaptobenzothiazole. The fusion mixture was stirred and kept at 240° C. for 15 minutes. An alkaline solution of the resulting 2-aminobenzenethiol was obtained by dilution with water. This product is preferably used in alkaline solution for further reaction, but can be isolated if desired by the method described in Example I.

*Example V*

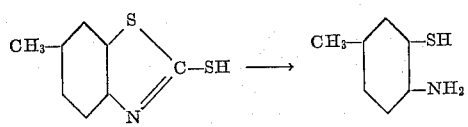

To a melt of 10 grams of potassium hydroxide, 10 grams of sodium hydroxide and 3 grams of sodium sulfide (9 $H_2O$) maintained at a temperature of 240° C. there were added 10.5 grams of 2-mercapto-6-methylbenzothiazole. The fusion mixture was stirred and kept at 240° C. for 15 minutes, allowed to cool and then diluted with 100 milliliters of water. This product is preferably used in alkaline solution for further reaction, but can be isolated if desired by the method described in Example II.

*Example VI*

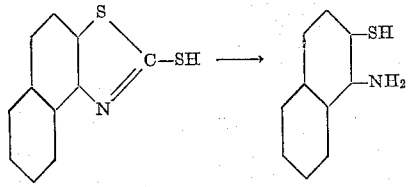

To a melt of 24 grams potassium hydroxide, 24 grams sodium hydroxide and 10 grams sodium sulfide (9 $H_2O$) maintained at 235–260° C. were added in 3 minutes, 10 grams of 2-mercapto-4,5-benzobenzothiazole. The temperature of the fusion mixture was maintained for a further 15 minutes and then diluted with 300 milliliters of water to give a solution of the 2-amino-3,4-benzobenzenethiol. This product is preferably used in alkaline solution for further reaction but can be isolated if desired by the method described in Example III.

*Example VII*

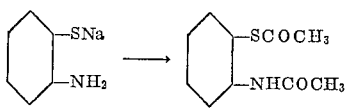

A slight excess of acetic anhydride was added to the alkaline solution obtained according to Example I until the solution was just acid. The diacetyl-2-aminophenol was obtained by filtering the precipitate formed. The yields could be further increased by extracting the mother liquor with a suitable solvent such as benzene and evaporating the benzene.

*Example VIII*

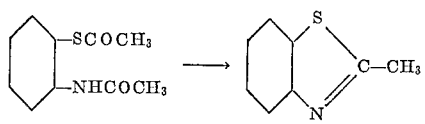

One part of the diacetyl-2-aminophenol obtained according to Example VII was mixed with 10 parts of acetic anhydride and 1 gram of zinc metal. The acetic anhydride was removed by distillation under atmospheric pressure. Ring closure and isolation of the 2-methylbenzothiazole were effected by continuing the distillation under reduced pressure.

*Example IX*

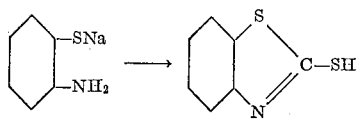

To an alkaline solution of o-aminobenzenethiol obtained according to Example I were added 7 milliliters of carbon disulfide. The resulting solution was stirred and refluxed on the steam bath for 1 hour. After cooling and neutralization, the 2-mercapto-benzothiazole was isolated by filtering and drying.

*Example X*

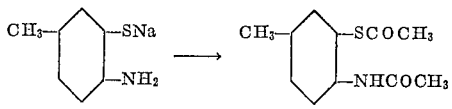

The alkaline solution obtained according to Example II was diluted to a final volume of 8 liters and filtered. To the filtrate were added 10 kilograms of ice and 6000 milliliters of acetic anhydride slowly with stirring at a temperature of 20–25° C. The resulting solid diacetyl 2-amino-5-methylbenzenethiol was filtered off and dried; yield—870 grams.

*Example XI*

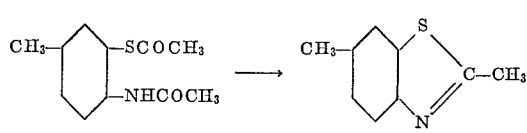

Diacetyl-2-amino-5-methylbenzenethiol as prepared in Example X, was refluxed for about 1 hour with 4000 milliliters of acetic anhydride and 50 grams of zinc dust. The reaction mixture was filtered, the acetic anhydride removed by distillation, and the product was ring closed and collected by fractional vacuum distillation. It boiled at 3 mm. pressure (B.P./3 mm. 103° C.) The yield of 2,6-dimethylbenzothiazole was 1440 grams (90 percent).

*Example XII*

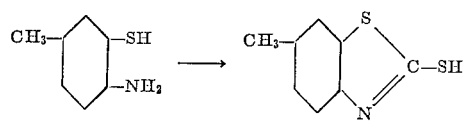

A fusion mixture prepared in accordance with Example II, but using only one-tenth of the quantities described in that example, was diluted with 500 milliliters of water to give an alkaline solution of 2-amino-5-methylbenzenethiol. To this solution were added, with stirring, 75 milliliters of carbon disulfide. Stirring was continued for 1 hour, during which time the reaction mixture was heated on a steam bath. After cooling and neutralization, the 2-mercapto-6-methylbenzothiazole was isolated in a yield of 90 percent.

*Example XIII*

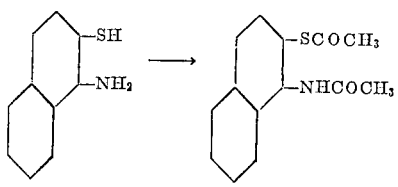

To a solution of 2-amino-3,4-benzobenzenethiol, obtained according to Example III, there were added 4000 milliliters of acetic anhydride at a temperature of 10–20° C. with stirring. The diacetyl derivative was obtained as a precipitate and isolated by filtration.

*Example XIV*

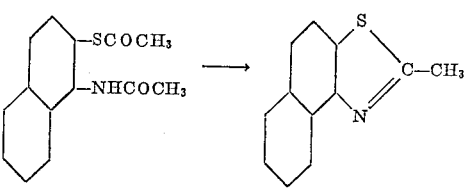

The diacetyl-2-amino-3,4-benzobenzenethiol obtained as in Example III was refluxed with 3000 milliliters of acetic anhydride and 25 grams of zinc dust for 2 hours. After removing the acetic anhydride by distillation at atmospheric pressure, the product 2-methyl-4,5-benzobenzothiazole was obtained by distillation under reduced pressure (B.P./4 mm. 140–150° C.) with a yield exceeding 65 percent.

*Example XV*

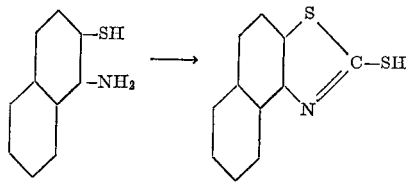

To a solution of 2-amino-3,4-benzobenzenethiol obtained according to Example III but using only one-tenth of the amounts described in that example, there were added 70 milliliters of carbon disulfide. The resulting solution was stirred and heated on a steam bath for 1 hour. By rendering neutral and cooling, 2-mercapto-4,5-benzobenzothiazole precipitated in better than 90 percent yield.

This application is a continuation-in-part of our copending application Serial No. 631,423, filed on December 31, 1956, and now abandoned.

It will be understood that the examples included therein are illustrative only and that our invention is to be taken as limited only by the scope of the appended claims.

We claim:
1. A process of preparing a compound of the following general formula:

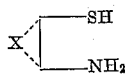

wherein X represents the carbon and hydrogen atoms necessary to complete an aromatic ring system selected from the group consisting of a benzene nucleus, methyl-substituted benzene nucleus, a dimethyl-substituted benzene nucleus, a phenyl-substituted benzene nucleus and a naphthalene nucleus; which comprises fusing at atmospheric pressure in an open vessel and for a period ranging from 3 to 30 minutes, a heterocyclic compound of the following general formula:

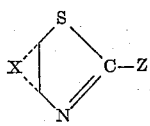

wherein X has the values given above and Z represents a substituent selected from the group consisting of halide atoms and hydroxy, amino, alkylamino, arylamino, mercapto, thioaryl and thioalkyl; in a melted fusion mixture consisting essentially of sodium hydroxide, potassium hydroxide and an alkali metal sulfide, said mixture having a fusion temperature ranging from 220° C. to 280° C., the amount of potassium hydroxide ranging from 20 to 60 mol percent, the amount of sodium hydroxide ranging from 40 to 80 mol percent, the amount of alkali metal sulfide ranging from 2% to 20% of anhydrous alkali metal sulfide based on the total weight of the alkali fusion mixture.

2. A process according to claim 1 wherein said alkali metal sulfide is sodium sulfide nonahydrate.

3. A process of preparing o-aminothiophenol which comprises fusing in an open vessel at atmospheric pressure 2-aminobenzothiazole at a temperature range from 220° C. to 280° C. and for a period ranging from 3 to 30 minutes in a melted mixture of substantially equal parts of sodium hydroxide and potassium hydroxide, said mixture containing an alkali metal sulfide as a reducing agent, the amount of alkali metal sulfide ranging from 2% to 20% of anhydrous alkali metal sulfide based on the total weight of the alkali fusion mixture.

4. A process of preparing o-aminothiophenol which comprises fusing in an open vessel at atmospheric pressure, 2-mercaptobenzothiazole at a temperature ranging from 220° C. to 280° C. and for a period ranging from 3 to 30 minutes in a melted mixture of substantially equal parts of sodium hydroxide and potassium hydroxide, said mixture containing an alkali metal sulfide as a reducing agent, the amount of alkali metal sulfide ranging from 2% to 20% of anhydrous alkali metal sulfide based on the total weight of the alkali fusion mixture.

5. A process of preparing 2-amino-3,4-benzobenzenethiol which comprises fusing in an open vessel at atmospheric pressure, 2-mercapto-4,5-benzobenzothiazole at a temperature ranging from 220° C. to 280° C. and for a period ranging from 3 to 30 minutes in a melted mixture of substantially equal parts of sodium hydroxide and potassium hydroxide, said mixture containing an alkali metal sulfide as a reducing agent, the amount of alkali metal sulfide ranging from 2% to 20% of anhydrous alkali metal sulfide based on the total weight of the alkali fusion mixture.

6. A process of preparing 2-amino-5-methylbenzenethiol which comprises fusing in an open vessel at atmospheric pressure, 2-amino-6-methylbenzothiazole at a temperature ranging from 220° C. to 280° C. and for a period ranging from 3 to 30 minutes in a mixture of substantially equal parts of sodium hydroxide and potassium hydroxide, said mixture containing an alkali metal sulfide as a reducing agent, the amount of alkali metal sulfide ranging from 2% to 20% of anhydrous alkali metal sulfide based on the total weight of the alkali fusion mixture.

7. A process of preparing 2-amino-3,4-benzobenzenethiol which comprises fusing in an open vessel at atmospheric pressure, 2-amino-4,5-benzobenzothiazole at a temperature ranging from 220° C. to 280° C. and for a period ranging from 3 to 30 minutes in a melted mixture of substantially equal parts of sodium hydroxide and potassium hydroxide, said mixture containing an alkali metal sulfide as a reducing agent, the amount of alkali metal sulfide ranging from 2% to 20% of anhydrous alkali metal sulfide based on the total weight of the alkali fusion mixture.

References Cited in the file of this patent

UNITED STATES PATENTS

| | | |
|---|---|---|
| 2,007,335 | Lubs et al. | July 9, 1935 |
| 2,458,485 | Vogt et al. | Jan. 4, 1949 |
| 2,791,612 | Kinstler et al. | May 7, 1957 |

FOREIGN PATENTS

| | | |
|---|---|---|
| 306,590 | Great Britain | Feb. 25, 1929 |

OTHER REFERENCES

Kaiser, "Organic Chemistry," 2nd eng. ed., Elsevier Publishing Co., Inc., New York, page 744 (1946).

Whitmore, "Organic Chemistry," 2nd ed., Van Nostrand Co., Inc., New York, page 155 (1951).